US006239374B1

(12) United States Patent
Kastner

(10) Patent No.: US 6,239,374 B1
(45) Date of Patent: May 29, 2001

(54) METHOD FOR PRODUCING A FLEXIBLE CABLE HARNESS

(75) Inventor: Michael Kastner, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/448,391

(22) Filed: Nov. 23, 1999

Related U.S. Application Data

(63) Continuation of application No. PCT/EP98/02770, filed on May 12, 1998.

(30) Foreign Application Priority Data

Jun. 3, 1997 (DE) ............................................. 197 23 167
Jun. 11, 1997 (DE) ............................................. 197 24 685

(51) Int. Cl.$^{7}$ .............................. H01R 4/00; H02G 15/08
(52) U.S. Cl. .................. 174/84 R; 174/88 R; 174/113 R
(58) Field of Search ............................ 174/113 R, 113 C, 174/116, 88 R, 84 R

(56) References Cited

U.S. PATENT DOCUMENTS 5,286,923 * 2/1994 Prudhon et al. ................. 174/113 R

FOREIGN PATENT DOCUMENTS 2459596 6/1976 (DE) .
0 305 058 * 3/1989 (EP) ................................ H01B/7/00
9203832 3/1992 (WO) .

* cited by examiner

*Primary Examiner*—Dean A. Reichard
*Assistant Examiner*—William H Mayo, III
(74) *Attorney, Agent, or Firm*—Baker Bott L.L.P.

(57) ABSTRACT

In the method for producing a flexible cable harness, several cables and a cable-like body having an adjustable cross-section are fixed to one another by wrapping, preferably with a wrapping tape. The fixed cross-section of the bundle of cables is enlarged before wrapping and reduced after wrapping by changing the cross-section of the cable-like member.

15 Claims, 1 Drawing Sheet

METHOD FOR PRODUCING A FLEXIBLE CABLE HARNESS

REFERENCE TO RELATED APPLICATION

This application is a continuation of International Application No. PCT/EP98/02770 filed May 12, 1998.

BACKGROUND OF THE INVENTION

This invention relates to methods for producing flexible cable harnesses such as cable trees for motor vehicles, and to the resulting harnesses.

Cable harnesses having a treelike structure, known as cable trees, are made of a bundle of several electric cables and are used for the electrical connection of components, consuming devices and assemblies. The electric cables which are parallel to each other are bundled together with predetermined departures of cables from the bundle and preferably are fixed in a bundle by wrapping tape or by an insulating cover. The cable harness must be flexible and should be capable of being wrapped so that it is packable and readily transportable and, for placement and assembly in a motor vehicle, it should also be capable of being bent 90°. With the increasing number of consuming and control devices in modem motor vehicles, the number, and in some cases the cross-section, of the cables to be connected in such a cable tree also increases and hence its flexibility decreases. Thus, the cable harness becomes increasingly rigid.

In order to prevent damage to the cables, complete enclosure of the cable harness is required. Complete but loose wrapping of the bundle, i.e., wrapping with low tensile force to assure adequate flexibility, can be obtained only by hand wrapping and leads to subjectively variable results with regard to wrapping thickness and strength. Wrapping machines, on the other hand, wrap with a high minimum tensile force, which leads to a very firmly wrapped and hence rigid cable harness.

In order to be able to wrap a cable harness mechanically and yet make it flexible, it has been sought to introduce into the cable harness, prior to wrapping, a blind cable in the form, for example, of a single cable of sizeable diameter or in the form of a wire having a non-adhesive coating, in particular a Teflon-coated wire, and, after mechanical wrapping of the harness, to withdraw the blind cable from the bundle, in order thereby to loosen the firmly and uniformly wrapped bundle of cables enclosed by the wrapping and increase the flexibility of the wrapped cable harness. This method has been found to have drawbacks. On the one hand, sticking of the blind cable to the wrapping tape or, with a blind cable having an anti-adhesion coating, sticking to adjacent cables, may occur which, in the latter case, may lead to damage of the cable insulation upon withdrawal of the blind cable and, on the other hand, makes withdrawal of the blind cable increasingly difficult with increasing length.

SUMMARY OF THE INVENTION

Accordingly, it is an object of the invention to provide a method for producing a flexible cable harness, and a resulting harness, which overcome disadvantages of the prior art.

Another object of the invention is to provide a method for producing a flexible cable harness in which the cable harness, after firm wrapping, maintains an adequate degree of flexibility.

These and other objects of the invention are attained by enclosing a bundle of cables together with a long cable-like body having an adjustable cross-section and, after the bundle has been enclosed, reducing the cross-section of the cable-like body. Introduction of a cable-like body with an adjustable cross-section into the bundle of cables enlarges the cross-section of the bundle to be enclosed by the initial cross-section of the cable-like body. The bundle of cables is then firmly enclosed mechanically in a conventional fashion, for example, by wrapping with wrapping tape. After wrapping has been completed and a rigid and not very flexible cable harness has been obtained, the cross-section of the cable-like body is reduced and the flexibility of the cable harness thereby increased. The wrapping process may be discontinued after only a portion of the bundle containing the cable-like body which is adjustable in its cross-section has been enclosed so that the cross-section of that portion of the bundle may be reduced as required for a particular application. In this case, if the cable-like member with an adjustable cross-section is an air-filled hose, for example, the cross-section of the wrapped portion of the bundle may be reduced by piercing or cutting the air hose, and then wrapping of the bundle can be continued. The diameter of the adjustable cable-like member and hence its share of the cross-section of the bundle of cables can be varied, as a result of which the flexibility of the cable harness can also be varied in a predetermined manner.

To this end, the cable-like member having adjustable cross-section may be made of an elastic material which is elastically expanded when it is introduced into the bundle and is relaxed or contracted after wrapping.

A suitable cable-like member having an adjustable cross-section may be, for example, an inflated hose of a thin-walled synthetic material or of thin-walled rubber, which is introduced into the bundle of cables in the inflated state and from which the filling gas, for example air, is released after enclosure of the bundle by wrapping, for example, by piercing the hose. In order to facilitate such piercing and make it suit a particular application, the hose may project from one end of the cable harness or, alternatively, it may be provided with a lateral tab. After release of the gas, the hose relaxes and contracts so that the fixed cross-section of the bundle of cables within the enclosure is reduced. As a result, the arrangement of the cables in the bundle becomes looser and the cable harness as a whole becomes more flexible even though the contracted hose remains in the cable harness. Damage to the cable insulation, which could occur upon withdrawal of a blind cable from the cable harness, is thereby avoided, and any disadvantageous sticking that could occur is not encountered.

Instead of an inflatable hose, an expanded long cable-like tube of a thermoplastic material may be placed in the bundle. In this case, the cable harness need only be heated briefly after enclosure of the bundle in order to shrink the tube and effect relaxation of the arrangement of bundle of cables and provide the desired increase in flexibility.

In addition, it is also possible to introduce a cable-like body of adjustable cross-section, not into the entire cable harness, but only into regions of the bundle which must be flexible based on assembly conditions, so that a cable harness having regions of unlike flexibility is produced.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
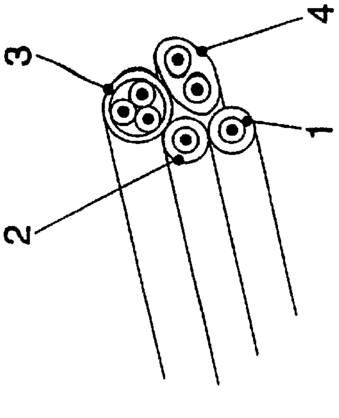
FIG. 1 is a fragmentary perspective view illustrating a loose bundle of cables.

In the typical prior art bundle of cables shown in FIG. 1, four different cables 1–4 are bundled with wrapping tape 6 on a wrapping machine to make a cable harness. The fixed cross-section of the bundle of cables is the sum of the four cable cross-sections.

Figure 4:
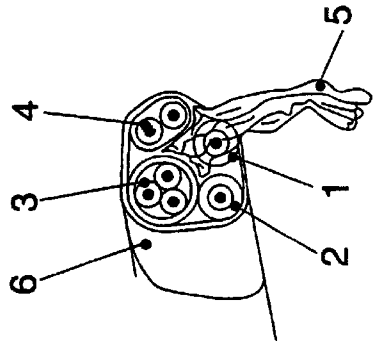
FIG. 4 is a view showing the finished flexible cable harness.
Figure 3:
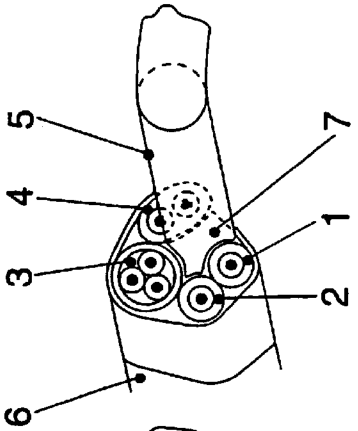
FIG. 3 is a view similar to FIG. 2 showing the bundle wrapped with wrapping tape.
Figure 2:
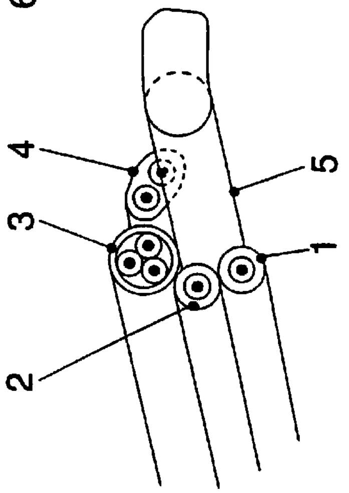
FIG. 2 is a view similar to FIG. 1 showing the bundle with an inflated hose added.

In accordance with the invention, a cable-like member of adjustable cross-section, such as an air-filled thin hose 5 of round cross-section, is added to this loose bundle of cables before wrapping as shown in FIG. 2. The cross-section of the inflated hose 5 amounts to about 15% of the total cross-section of the cables. This loose bundle is then fed to a wrapping machine and wrapped tightly with wrapping tape 6 in a conventional manner, so that the cables 1–4 are pressed against the hose 5. As a result, the hose 5 is deformed and partially pressed into the cable wrapping and also is compressed as a function of the wrapping tension, as shown in FIG. 3. After wrapping, the hose 5 has a cross-section of irregular shape 7 and still occupies about 10% of the total cross-section, since the regions which are pressed into the cable wrapping are also included in the total cross-section.

The cables 1–4 are also pressed against each other, and the cable harness produced by the wrapping is slightly pre-stressed by the compressed hose 5 in the direction of the wrapping 6 and is rigid. The hose 5 is then opened by piercing, permitting the air to escape, and the fixed cross-section of the bundle of cables enclosed by the wrapping 6 is reduced, so that the cable harness relaxes. The cables 1–4 now rest against each other without pressure and have some play with respect to each other. In this condition, the cable harness is flexible and adequately bendable and is thus packable and more easily transportable, and can also be assembled more easily in a vehicle or other product in which it is to be used.

Figure 5:
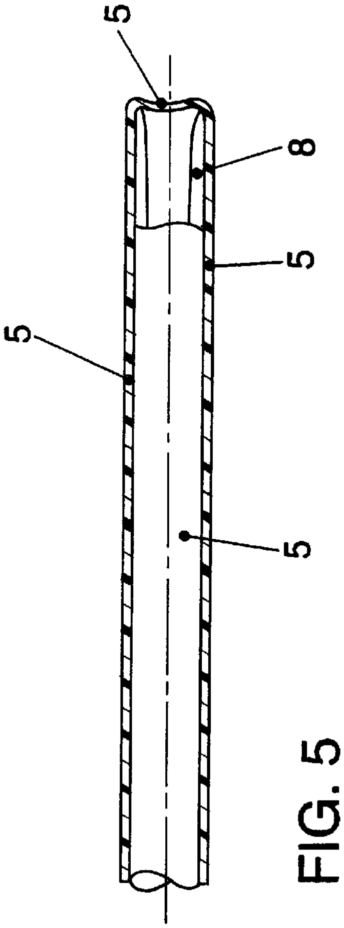
FIG. 5 is a side view showing a representative embodiment of a cable-like member with an adjustable cross-section according to the invention in the form of a tube which is closed at one end.

A section of one form of hose 5 providing a cable-like member of adjustable cross-section is illustrated in FIG. 5. In this embodiment, a hose 5 is made up of two superposed films of polyethylene or the like which are welded together at the edges and then inflated. In the inflated condition, the end region 8 of the tube tapers as far as the weld seam on the end face. This region 8 projects from the end of the bundle of cables as a tab operable to permit release of the enclosed air.

To prevent undesirable crumpling noises from the hose 5 during flexing of the bundle, the hose may contain lubricating additives such as calcium stearate or other lubricating agents. This is especially advantageous when the cable harness is located near the ears of passengers in the vehicle, for example, in the upper part of the B or C column or within the roof of the vehicle.

Although the invention has been described herein with reference to specific embodiments, many modifications and variations therein will readily occur to those skilled in the art. Accordingly, all such variations and modifications are included within the intended scope of the invention.

I claim:

1. A cable-like body for a cable harness containing a bundle of cables held together by an enclosure and wherein the fixed cross-section of the bundle of cables to be enclosed is enlarged before being enclosed and reduced after being enclosed comprising a cable-like body member having an adjustable cross-sectional area to be contained in the bundle within the enclosure.

2. A cable-like body according to claim 1 wherein the cable-like body member comprises an elastic material.

3. A cable-like body according to claim 1 wherein the cable-like body is an inflatable hose.

4. A cable-like body according to claim 1 wherein the cable-like body member comprises a thin-walled synthetic material or thin-walled rubber.

5. A cable-like body according to claim 1 wherein the cable-like body member is provided with a tab.

6. A bundle of cables for a flexible cable harness comprising at least one blind cable and one enclosure for a bundle wherein the at least one blind cable is a cable-like body with an adjustable cross-sectional area contained in the bundle within the enclosure.

7. A bundle of cables according to claim 6 wherein the cable-like body is an inflated hose of thin-walled synthetic material or rubber.

8. A bundle of cables according to claim 7 wherein the hose has a tab which projects from the bundle of cables.

9. A method for producing a flexible cable harness containing a plurality of cables held together by an enclosure, comprising introducing a cable-like body having an adjustable cross-sectional area into a bundle of cables, and enclosing the bundle of cables together with the cable-like body having an adjustable cross-sectional area.

10. A method according to claim 9 wherein the cable-like body comprises an elastic material and is introduced into the bundle of cables in an expanded condition and is contracted after enclosure of the bundle is completed.

11. A method according to claim 9 wherein the cable-like body is an inflatable hose which is introduced into the bundle of cables while inflated with a filling gas and from which the filling gas is released after enclosure of the bundle.

12. A method according to claim 11 wherein the inflatable hose comprises a thin-walled synthetic material or thin-walled rubber.

13. A method according to claim 11 wherein the hose is provided with a tab.

14. A method according to claim 9 wherein the cable-like body having an adjustable cross-section is contracted to increase flexibility of the bundle and is retained in the bundle after contraction.

15. A method according to claim 9 wherein the cable-like body is introduced into only predetermined regions of the bundle which are to be made flexible.

* * * * *